United States Patent Office 3,270,093
Patented August 30, 1966

3,270,093
O,O-NEOPENTYLENE-N-DIETHYLPHOSPHORO-
AMIDOTHIOATE
Marcel A. Gradsten, Demarest, N.J., assignor, by mesne
assignments, to Tenneco Chemicals, Inc., a corporation
of Delaware
No Drawing. Filed Apr. 19, 1963, Ser. No. 274,336
1 Claim. (Cl. 260—937)

This invention relates to a novel phosphoroamidothioate, insecticidal compositions containing this compound, and use of this compound to control insects.

It has been discovered that the novel compound, O,O-neopentylene-N-diethylphosphoroamidothioate, is an effective insecticide. This compound has the formula:

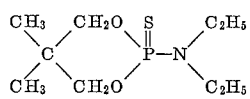

The insecticide of the present invention can be used as the pure compound or in combination with other materials including other insecticides. The present insecticide can be employed by mixing it with conventional adjuvants, modifiers, diluents, or solvents, hereinafter referred to as carriers, to provide solutions, emulsions, dispersions, powders dispersible in water or other liquids, dusts, or the like. The amidothioate is insoluble in water and soluble in benzene, methanol, and acetone. Emulsions may be formed by dissolving the insecticide in a water-insoluble solvent and then dispersing the solution in water with the aid of an emulsifying agent. The insecticide may be formulated as liquid sprays, aerosols, wettable powders, dusts, emulsifiable concentrates, or the like, as is well-known in the formulation and use of insecticides.

While the insecticide of the present invention will be described more particularly in connection with the control of flies, it may be used for controlling other insects. The terms "insects" and "insecticide" are used in their broad common usage and include invertebrate animals belonging to the class Insecta as well as others such as spiders, mites, lice, nematodes, and the like.

The present insecticide can be made as described in the following examples, Examples 1 and 2, or it may be produced in any other suitable manner.

*Example 1*

To a solution of 170 grams (1 mole) of thiophosphoryl chloride in 700 ml. of benzene, there was slowly added over a period of 1½ hours, with stirring, and at a temperature of 13° to 17° C., a solution of 104 grams (1 mole) of neopentyl glycol, 158 grams (2 moles) of pyridine, and 200 ml. of benzene. After completing the addition, the temperature was allowed to rise slowly to room temperature. Stirring was continued overnight at room temperature. The reaction mixture was filtered under suction and the filtrate collected. The filter cake was washed with 100 ml. of benzene. Thereafter, the filter cake was washed with another two 50 ml. portions of benzene. The dried benzene extracts (combined original filtrate and wash benzene) were evaporated to dryness, an aspirator being used to maintain a vacuum. The pot residue was a light brown solid and was dissolved in hot petroleum ether. A small amount of an oily insoluble product was discarded. The solution was cooled and the crystallized product recovered and air-dried. The dried product was slightly yellow in color, weighed 162 grams, and had a melting point of 85°–87° C. The mother liquor was concentrated and there was obtained a second crop of yellow crystals weighing 10 grams. The product was neopentylene chlorothiophosphate containing a small amount of impurities.

In the foregoing example, the pyridine was used as an acid scavenger and the filter cake primarily consisted of the pyridinehydrochloric acid complex. The primary reactions involved can be represented by the following equation:

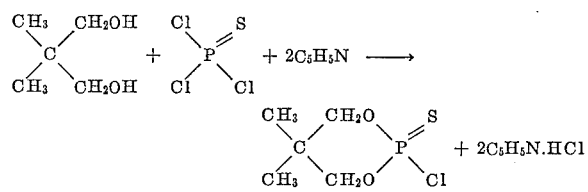

*Example 2*

O,O-neopentylene-N-diethylphosphoroamidothioate can be prepared by reacting neopentylene chlorothiophosphate with diethylamine:

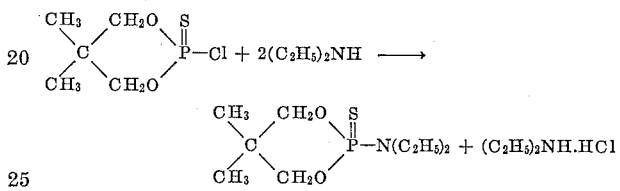

A solution of 15 grams (0.2 mole) of diethylamine in 50 ml. of acetone was slowly added with stirring to a solution of 20.5 grams (0.1 mole) of neopentylene chlorothiophosphate in 100 ml. of acetone at a temperature of 25° C. The reaction mixture was refluxed for 6.5 hours. The resulting mixture was filtered to separate about 7 grams of water-soluble crystals. The filtrate was evaporated to dryness to yield an amber oil which was dissolved in 100 ml. of benzene. The benzene solution was repeatedly washed with an aqueous sodium carbonate solution and then with water to a neutral pH value. After drying the washed solution over anhydrous sodium sulfate and evaporation, an amber oil was obtained which crystallized on cooling. This product was found to be a mixture of unreacted neopentylene chlorothiophosphate and the desired amidothioate. This mixture was repeatedly fractionally recrystallized from boiling ligroin to obtain O,O-neopentylene-N-diethylphosphoroamidothioate.

*Example 3*

The present insecticide was tested against houseflies (*Musca domestica*). Diazinon was used as a control.

Each of the materials was dissolved in acetone, 20 mg. of insecticide per one ml. acetone, and 5 ml. of these solutions were applied to 100 sq. in. panels. The panels were allowed to dry for 20 minutes. Flies were exposed to the treated surfaces for 15 minutes and then removed to clean surfaces and supplied with food. Embroidery hoops covered on one side with clear plastic were used to confine the flies on the treated surfaces. Mortalities were observed at 15 minutes, 30 minutes, 1 hour, and 24 hours. Four determinations were made. The percent mortalities (average of the four determinations) were as follows:

| | Percent Mortality | | | |
|---|---|---|---|---|
| | 15 min. | 30 min. | 1 hour | 24 hours |
| Diazinon | 100 | | | |
| Amiidothioate* | 27 | 58 | 87 | 97 |

*O,O-neopentylene-N-diethylphosphoroamidothioate.

The behavior of the flies was noted during the test. The flies settled on the panel surfaces treated with Diazinon and no repellency was noted. However, the flies were repelled by the panel surfaces treated with the amidothioate. The flies when lighting on the surface "jumped" across the surface and tended to congregate on the surface of the metal embroidery hoops. The flies were in contact with the treated surface for only a very short time.

*Example 4*

This test was carried out with two-day-old Wilson adult flies in the same manner and at the same dosage as in Example 3. Five milliliters of an acetone solution of the insecticide, 100 mg. of insecticide, were applied to 100 square inches of plywood panels which were allowed to dry for 20 minutes. After drying, over 40 flies were exposed to the treated surfaces for 15 minutes and then removed by the embroidery hoop method. The number of fly knockdown at the ends of the indicated periods were counted and the percent mortality at the end of 24 hours was calculated. In the following table "Total No. Flies" refers to the number of flies exposed to the treated surface.

With Diazinon there was no repellency and knockdown occurred towards the end of the 15-minute period. The amidothioate was a different batch than that used in Example 3. However, the repellency still caused the flies to be disturbed and remain only for short times on the panel, and retreat to the untreated hoops. The repellency tended to increase during exposure.

The amidothioate may be used to maintain an area or space free of flies by its toxic and repellent effect on flies. It has been found as a result of topical application to flies that the toxicity of the amidothioate is about equal to or slightly better than dichloro-diphenyl-trichloroethane, DDT.

I claim:

O,O-neopentylene-N-diethylphosphoroamidothioate.

| Insecticide | No. Dead at End of— | | | | Total No. Flies | Percent Mortality, 24 hours |
|---|---|---|---|---|---|---|
| | 15 min. | 30 min. | 1 hour | 24 hours | | |
| Diazinon [1] | 65 | | | | 65 | 100 |
| Do | 72 | | | | 72 | 100 |
| Do | 64 | | | | 64 | 100 |
| Do | 57 | | | | 57 | 100 |
| Amidothioate [2] | 0 | 10 | 29 | 35 | 55 | 64 |
| Do | 20 | 46 | 55 | 54 | 56 | 96 |
| Do | 6 | 12 | 28 | 48 | 51 | 94 |
| Do | 7 | 15 | 25 | 47 | 49 | 96 |

[1] Diazinon is [$(CH_3)_2CHC_4N_2H(CH_3)O$]$PS(OC_2H_5)_2$.
[2] Amidothioate is O,O-neopentylene-N-diethylphosporoamidothioate.

References Cited by the Examiner

UNITED STATES PATENTS

| | | | |
|---|---|---|---|
| 2,875,235 | 2/1959 | Lanham | 260—461.104 |
| 2,894,016 | 7/1959 | Lanham | 260—461.104 |
| 2,922,813 | 1/1960 | Lanham | 260—461.104 |
| 2,955,069 | 10/1960 | Jones et al. | 167—22 |
| 2,955,070 | 10/1960 | Jones et al. | 167—22 |
| 2,967,884 | 1/1961 | Dunn et al. | 260—461.104 X |
| 3,000,709 | 9/1961 | Orloff et al. | 260—461.304 X |
| 3,070,619 | 12/1962 | Lanham | 260—461 |
| 3,074,992 | 1/1963 | Arnold | 260—461 |

FOREIGN PATENTS 759,396  10/1956  Great Britain.

OTHER REFERENCES

Arbuzov: "Chem. Abst.," vol. 47, col. 1046(f) (1953).

CHARLES B. PARKER, *Primary Examiner.*

JULIAN LEVITT, *Examiner.*

D. B. MOYER, F. M. SIKORA, *Assistant Examiners.*